Sept. 14, 1965  H. LANGENBERG ETAL  3,205,743
CUTTING DEVICE FOR CUTTING OFF TREAD STRIPS
Filed June 12, 1963

INVENTORS:
Hartmut Langenberg
Alfred Seyler
By

United States Patent Office 3,205,743
Patented Sept. 14, 1965

3,205,743
CUTTING DEVICE FOR CUTTING OFF
TREAD STRIPS
Hartmut Langenberg, Krahenwinkel uber Hannover, and Alfred Seyler, Hannover, Germany, assignors to Continental Gummi-Werke Aktiengesellschaft, Hannover, Germany
Filed June 12, 1963, Ser. No. 287,358
1 Claim. (Cl. 83—215)

The present invention relates to a cutting device for cutting off tread strips, which comprises a cutting knife movable in a direction transverse to the tread strip to be cut off and generally designed as a high-speed rotating circular knife arranged at the free end of a rotatable shaft.

In connection with the manufacturer of tires, the tread strips are injection molded in considerable length and from the thus obtained strips, sections are cut off corresponding in length to the circumference of the unvulcanized tire. With the tread strips produced in a continuous process and still in a plastic or plastic elastic condition, it is advantageous, in order better to take advantage of the cutting device, to carry out one cut in one transverse direction of the strip to be cut and to carry out the next cut in the opposite direction. In this way, the cutting knife carries out a reciprocatory movement, and each transverse movement corresponds to one working stroke.

Inasmuch as the tread strip during the cutting operation rests on a support, for instance a conveyor belt or the like moving in the longitudinal direction of the strip to be cut off, it is unavoidable that the tread strip will be somewhat distorted by the cutting pressure. As a result thereof, no uniform plane cutting surface is obtained even though the cutting knife during its cutting operation is guided along a rectilinear path. This deformation occurring during the cutting operation is dependent on the direction of movement of the cutting knife. Thus, when the cutting knife carries out a cutting operation in both directions of movement, a fast cutting sequence will be assured. However, difficulties occur when placing the thus cut off tread strips onto the tire carcass. The cutting surfaces of the cut off tread strip when joined together on the tire-building drum are not uniformly shaped inasmuch as, for instance, a slight outward arch on the cutting surface will not face a corresponding depression on the other cutting surface of the strip.

It is, therefore, an object of the present invention to provide a cutting device for cutting off tread strips in connection with the making of tires, which will overcome the above-mentioned drawbacks.

It is another object of this invention to provide a cutting device of the type set forth above, which, while assuring a quick cutting sequence, will obviate any drawbacks which heretofore were unavoidable in view of unavoidable deformations occurring during the cutting operation.

These and other objects and advantages of the invention will appear more clearly from the following specification in connection with the accompanying drawing, in which.

Figure 1:
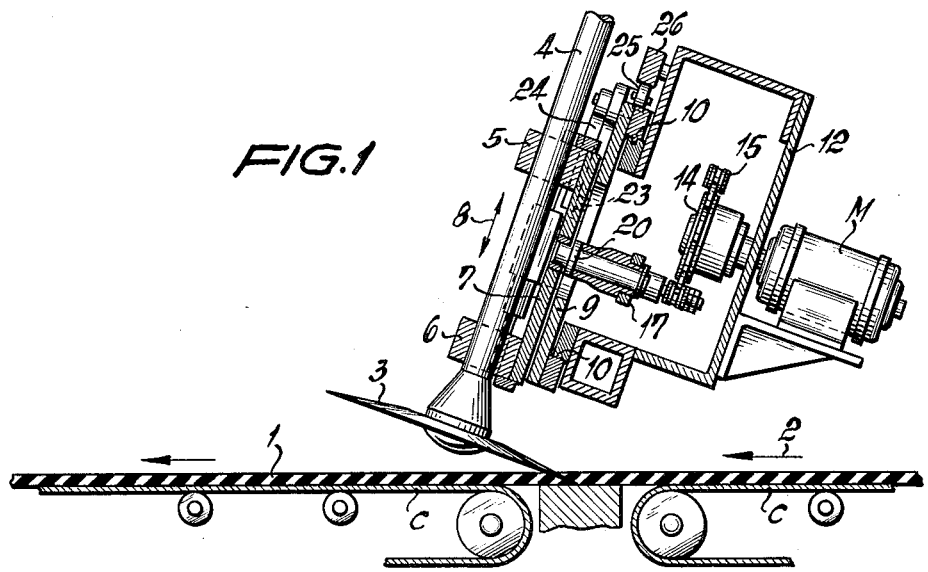
FIGURE 1 illustrates, partly in side view and partly in section, a cutting device for tread strips in conformity with the present invention.

The cutting device according to the present invention is characterized primarily in that the cutting knife is adapted to be lifted and lowered and additionally is operatively connected with a belt drive, a chain drive, or a similar enveloping drive in such a manner that the belt or the chain brings about the transverse movement as well as the lifting and lowering movement of the cutting knife. Advantageously, the cutting knife is mounted in guiding means extending substantially parallel to the shaft of the cutting knife so that the cutting knife can be lifted and lowered. This guiding means forms a part of a carriage which, in its turn, is mounted on corresponding guiding rails extending transverse to the direction of the tread strip to be cut.

The cutting knife is, in conformity with the invention, lifted and lowered and displaced in a direction transverse to the longitudinal direction of the tread strip in such a way that the working stroke will always be carried out in one direction only. After the working stroke has been completed, the cutting knife is lifted and returned to its starting position. After the cutting knife has again been moved into its working position, i.e., has been lowered again, a further cut can be carried out. Due to the coupling of the cutting knife to an enveloping drive, the just-mentioned working cycle will be assured. The circulating speed will determine the cutting frequency. The lifting and lowering movement, however, corresponds to the change in height of a belt section or a chain link, which change in height is determined by the distance between the taut and slack or upper and lower sections of the belt, chain drive, or the like.

Inasmuch as furthermore, the cut is always carried out from one side of the tread strip, the irregularities in the cutting surface as they occur during the exertion of the cutting pressure can no longer entail any drawbacks. It will be appreciated that when the thus cut tire tread strip is joined on the tire building drum to form a closed ring, the irregularities produced by the cut compensate each other. In other words, a protrusion on one cutting surface will, when joining the cutting surfaces, engage a correspondingly recessed surface portion of the other cutting surface.

Referring now to the drawings in detail, the tread strip of rubber or the like which is to be processed and cut to length is designated with the reference numeral 1 and passes over a support, for instance a conveyor belt C moving in the direction of the arrow 2 when the circular knife 3 of the cutting device does not engage the tread strip 1. In conformity with the illustration in FIG. 1, the cut by the cutting knife 3 is carried out at an acute angle with regard to the tread strip 1 or the direction of movement 2 of said tread strip.

Figure 2:
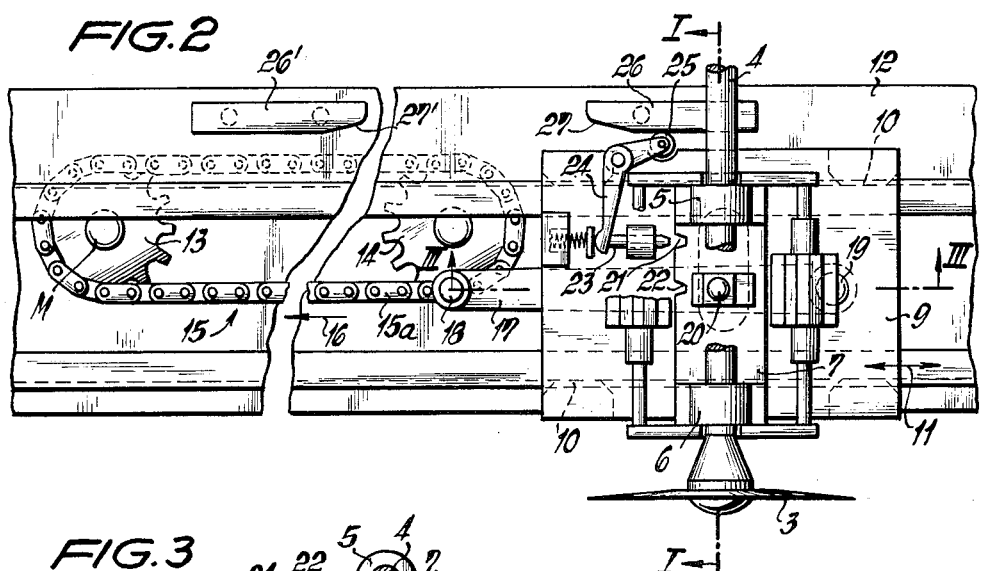
FIGURE 2 illustrates the cutting device of the present invention as seen looking downwardly and to the right in FIGURE 1.
Figure 3:
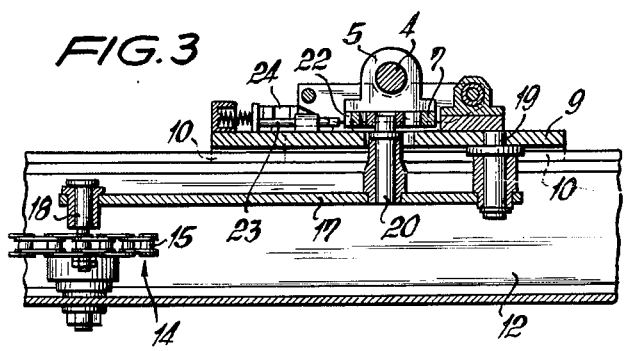
FIGURE 3 illustrates, partly in section, the cutting device according to FIGURE 2 as taken along the section line III—III.

As will be evident from the drawing, the cutting knife 3 is connected to a shaft 4 which extends at a steep angle with regard to the direction of movement of the tread strip 1. Shaft 4 is journalled in bearings 5 and 6 and is driven by any convenient means (not shown), for instance through a flexible shaft. The bearings 5 and 6 are connected to a carriage 7 which is movable up and down in the direction of the double arrow 8, i.e., in axial direction of shaft 4. FIGS. 1 and 2 show the circular knife 3 in its lowermost end position, which represents the working or cutting position.

Carriage 7, in its turn, is mounted on a carriage 9 which is reciprocable in the direction of the double arrow 11 and is guided on transverse guiding means such as rails 10. The direction of the double arrow 11 corresponds to the transverse direction of the tread strip.

The guiding means 10 form a part of a box-shaped transverse beam 12 in which is arranged an enveloping drive such as a belt drive or a chain drive. The said enveloping drive comprises a driving sprocket 13, a reversing sprocket 14, and a chain 15 passing around and meshing with the two sprockets 13 and 14, said chain rotating in the direction of the arrow 16. Chain sprocket 13 is driven by any convenient means, for instance a motor M. The axes of rotation of sprockets 13 and 14 are substantially perpendicular to the guiding means for the carriage 7. Pivotally connected to a chain link at 18 is one end of a rocker arm or link 17 the other end of which is pivotally connected at 19 to the carriage 9. Between the pivots and connecting points 18 and 19, the arm 17 is provided with a further pivot 20 or the like which is connected to the carriage 7 in such a way that carriage 7 will carry out a lifting or lowering movement in response to a corresponding rocking movement of arm 17.

FIG. 2 shows the starting position of the cutting device for starting a cutting operation. When chain 15 rotates, the pivot or connecting point 18 will, in conformity with the course of the slack section 15a of chain 15, move in rectilinear direction. It is during this movement that the cutting operation is carried out by the cutting knife 3. When the pivot or connecting point 18 comes into the range of the sprockets 13, the pivot or connecting point 18 is moved into the upper or taut section 15b of the chain 15, as a result of which the rocker arm 17 pivots about pivot point 19 so that the carriage 7 with knife 3 will be lifted. In other words, after the knife 3 has performed its cutting operation, it is lifted off the tread strip and moved in upward direction. The tread strip 1 now may be advanced to the desired extent in the direction of the arrow 2, and while the knife 3 moves in its raised position, the pivot or connecting point 8 may be returned to its FIG. 2 position. When, during this operation, the pivot or connecting point 18 comes into the range of the sprocket 14, the pivot or connecting point 18 is lowered. In view of the pivotal movement of rocker arm 17 inherent to the thus described movement of pivot or connecting point 18, carriage 7 with knife 3 is lowered so that knife 3 can move to its starting position shown in FIG. 2.

In order better to assure the thus described working cycle, arresting means are provided for arresting the carriage 7 in its respective upper and lower positions. To this end carriage 7 has one side thereof provided with cutouts 21 and 22 adapted to be engaged by a spring-biased pin 23. When pin 23 engages the upper cutout 22, the carriage is held in its working position, whereas when pin 23 engages the lower cutout 21, knife 3 is held in its upper end position, which is required for the return stroke of carriage 7. In order to be able to vary the position of carriage 7 and to render the arresting means ineffective during the stroke of carriage 7, a two-arm lever 24 is journalled on carriage 9 and provided with a roller 25. Furthermore, the transverse beam 12 is equipped with two control cams 26 and 26' with inclined modifications within the scope of the appended claim. 26, 26' are so arranged that the roller 25 can move onto surface 27' prior to pivot or connecting point 18 engaging sprocket 13. By means of cam 26, lever 24 will be turned so that pin 23 is lifted out of cutout 22. In view of the reversing operation of sprocket 13, a lifting movement of carriage 7 will be effected without being impeded by pin 23. When roller 25 during the further movement of pivot or connecting point 18 leaves cam 26', the double lever 24 becomes ineffective, and pin 23 is then able again to engage the lower cutout 22 to thereby arrest carriage 7. This control of the arresting means by displacement of pin 23 is carried out correspondingly with surface 27 of cam 26, i.e., when the pivot or connecting point 18 comes into the range of sprocket 14, and pin 23 can again engage cutout 21 when pivot or connecting point 18 has left sprocket 14.

It is, of course, to be understood that the present invention is, by no means, limited to the particular construction shown in the drawings, but also comprises any modifications within the scope of the appended claim.

What we claim is:

A cutting apparatus for cutting off sections from strip material, especially a tread strip, which includes: first supporting means for supporting the strip material from which sections are to be cut off, said first supporting means having its longitudinal extension in the direction in which the strip material is to be fed toward the cutting apparatus, second supporting means arranged in vertically spaced relationship to said first supporting means and having its longitudinal extension in the direction transverse to the longitudinal extension of said first supporting means, first carriage means supported by said second supporting means and movable in the direction transverse to the longitudinal extension of said first supporting means, second carriage means supported by said first carriage means and movable toward and away from said first supporting means, said second carriage means being movable from a first end position to a second end position and vice versa, said second carriage means being provided with recess means spaced from each other in the direction of movement of said second carriage means, spring biased arresting means operable to engage one of said recess means when said second carriage means occupies its first and second end position respectively, cam means arranged at predetermined positions along the path of said first carriage means, knife means carried by said second carriage means for cutting off sections from strip material on said first supporting means, endless conveying means supported by said second supporting means, link means pivotally connected to said endless conveying means and to said first carriage means, said link means also being pivotally connected to said second carriage between the pivotal connection of said link means with said endless conveying means and said first carriage means, and control means carried by said first carriage means and operable by said cam means when engaging the latter, said control means being operable when actuated by said cam means to withdraw said arresting means from the respective recess means.

References Cited by the Examiner

UNITED STATES PATENTS

| 2,544,241 | 3/51 | Sternad | 83—488 |
| 3,072,004 | 1/63 | Jenkins | 83—488 |

FOREIGN PATENTS 243,519  2/63  Australia.

ANDREW R. JUHASZ, *Primary Examiner.*